Dec. 9, 1952         G. BONMARTINI         2,621,085

ENDLESS TRAVELER BANDS, TRACKS, AND THE LIKE

Filed Dec. 2, 1948

INVENTOR
GIOVANNI BONMARTINI
BY
ATTORNEY

Patented Dec. 9, 1952

2,621,085

UNITED STATES PATENT OFFICE 2,621,085

ENDLESS TRAVELER BANDS, TRACKS, AND THE LIKE

Giovanni Bonmartini, Rome, Italy, assignor to "E S T"—Etablissement Sciences Techniques, Vaduz, principality of Liechtenstein, a company of Liechtenstein Application December 2, 1948, Serial No. 62,993
In Italy November 23, 1948

8 Claims. (Cl. 305—10)

The present invention relates to endless tracks and the like.

According to the present invention a track consists of a tubular ring-shaped element.

The present invention provides a novel system of track to be applied in all those applications in which, desiring to ensure a better distribution of the load in a rolling system, one is compelled to substitute for the usual wheel another means possessing a large surface of contact between the vehicle and the ground, be this latter earth, sand, mud, snow, etc.

The normal tracks applied on tanks, tractors etc. are constituted by a series of plates united one to the other by means of hinged-joints. The said hinges are for the purpose of giving the track the flexibility necessary to allow this latter to wind around the terminal wheels. However, such flexibility deprives the track of the possibility of supporting the distributed load due to the reaction of the ground, in the zone interposed between the terminal wheels of the support. In order to obviate this such inconvenience, there are inserted, between the terminal wheels, more than one secondary wheel, arranged in the interior of the bottom length of the track, in such a way as to separate the main-span into as many spans as are necessary for the intermediary wheels plus one. The whole of the track comprising hinged articulated plates and the supporting girder with its multiple wheels, becomes very heavy and only little fit to assume high speeds. This feature, which has no great importance in the application on tanks and tractors, becomes, nevertheless, prohibitive when it is desired to adopt track-operated landing-gears, for example, in the field of aircraft constructions.

A track-operated landing-gear for aircraft, in which the restricted rigidity manifested in all senses by the track, comprising a band of armed rubber, partially compensated by the adoption of a system of multiple articulated wheels, is known.

The system of track, which is the object of the present invention, comprises a tubular element closed in itself a mixtilinear form, and made of a flexible material (e. g. steel, light alloys, synthetic-resins etc.) having a cross-section appropriately profiled so as to insure a high resistance to the transverse bending in the rectilinear extensions, which are located between the terminal wheels and a high flexibility in the length, in which the tube rendered flat, is being wound around the arcs of circle represented by the terminal supporting wheels. The resistance to the bending manifested by the rectilinear extensions of the tube makes it possible to completely obviate (or reduce to a minimum) the span-breaking intermediary wheels. The so constituted track, owing to its mechanical strength, elasticity and lightness, proves to be particularly suitable in the field of the aeronautical constructions.

The mechanical strength of the tube-track becomes manifest not only in withstanding the stresses due to the reaction of the ground, but also, in a remarkable measure, in opposing to the transverse stresses which also manifest themselves in the aeronautical applications (landing with lateral wind, shiftings on the ground etc.)

In order to allow the easy flattening of the tube track the zones where it is bent in the shape of an arc of a circle to partially surround the terminal wheels of the supporting girder, the shape of the section of the continuous tube must be opportunely chosen. A suitable form of section for example is the lenticular one with a biconvex profile, the two convexities being arranged one in the interior of the mixtilinear ring and the other on the exterior. With such a form, when the tube has the biconvex profile, it is compelled to bend according to the curve of the wheels provided with a cylindrical external surface, the tube track will then annul its biconvexity, flattens and allows its bending with no appreciable strain. Such flexibility imparts the necessary slidability during the rolling motion of the tubular track mounted on its support. The passage of any section of the tube from the biconvex shape to the flattened one and its successive return to the biconvex shape, would induce in the connection-lips between the two biconvex surfaces elevated local deformations, such as to exceed eventually the limit of permanent deformation of the material. To the end of obviating this drawback and in order to obtain a major flexibility and slidability, the tube-track may be manufactured from various materials. For example, along the two generatrices which correspond to the zone of the connection between the two convex surfaces, the tube-track may be previously cut in such a way as to seperate the two convex surfaces; the continuity of the wall being then reconstituted by means of the application of some flexible and supple but not extensible material (for example armed rubber).

Another variation of the tube according to the present invention is as follows: the tube-track is given a flattened shape so that the two faces, instead of being convex are plane and tallying; the continuity of the wall, at the level of the two connection-lips, comprises the abovementioned joint-cover. This form of flat tube-track, owing to the thinness of the tallying walls, has a perfect flexibility in the portions being bent in the shape of an arc of a circle. The bending-resistance in the rectilinear extensions, which are interposed between wheel and terminal wheel, is ensured by over-raising the air-pressure in the interior of the tube, by means of inflating the same. The inflating is carried into effect, through a common air-chamber valve fitted in any point of the tube-track. The increase of the pressure in the interior enhances the convexity of the profile, hence, increases the bending-resistance of the rectilinear extensions of the tube-track. In the zones in which the tube-track is wound on the wheels, the deformation of the walls cylindrically with the axis perpendicular to that of the double convexity, compels the walls to flatten and to return reassuming the biconvex shape when the tube-track leaves the wheel. While the rolling-motion is being carried into effect, the lenticular section zones are continuously displaced along the tube-track together with the said zones, as well as the air stored therein. The permeability, either natural or preconstituted (for example, by means of a band of restricted thickness, inserted between the two walls of the tube-track) of the flattened track zones, ensures the maintenance of the constant balance of the the pressures between the various rectilinear portions. Thence it follows clearly, that by the application of compressed-air in the interior of the tube-track, owing to pneumatic factors, the distribution of the strains due to the reaction exerted by the ground upon the tube-track, are improved, which will become manifest over the bottom part of the same.

Still another variation of the present invention, is given by the following form: In the interior of the flattened tube-track is inserted a similarly flat air-chamber, occupying partially or totally the space existing between the walls. In this case, the pressure which deforms the walls, according to a biconvex lenticular profile, is established in the interior of the said air-chamber. In the walls in which the tube surrounds the wheels and flattens, the air-chamber also becomes flattened. In this case, just as in the preceding one, the volumes of air comprised between one flattened zone and the other while the tube-track is wound around the wheels, remain constant.

Should the air-chamber partially occupy the inner space of the tube-track, it will have a cylindrical section of development noticeably inferior to that of the tube-track. The concentration of the internal reaction due to the air-chamber in the central zone of the biconvex lenticular section, increases remarkably the rigidity of the tube, diminishing the possibility of the same becoming scalloped.

According to still another form of the invention, in order to diminish the importance of the work to be carried in effect by the internal pressure, to the end of securing the transformation of the flattened section into a lenticular one, the tube-track may be, as in the first instance, previously formed by two convexly profiled walls with convexities facing each other, and rendered both continuous and impermeable by means of joint-covers. The air can be introduced either directly into the tube-track or with the insertion therebetween of a centrally arranged air-chamber.

According to still another form of the invention, the tube-track may comprise two half-walls connected together along the lips, as previously explained, yet with the difference that one, for instance the inside one (coming into contact with the wheels) may be made of steel, whereas the other of rubber with insertions of cloth or of any similar material. The internal pressure, applied either directly or by means of an air-chamber, provides the maintenance of the lenticular shape when using either plane walls or walls with sections preventively rendered concave. In case it is the external wall which will be made of rubber, the tube-track will manifest a greater attitude to damp the small roughnesses of the ground. The shape with closed tubular section which characterizes the track forming the object of the present patent, offers obvious advantages because of its rigidity and stability in all directions as compared with other known solutions. The stability of form of the track with tubular section, furthermore, permits the application of materials having mechanical features and weight inferior to those required by the regular but non-tubular metallic tracks.

The invention is illustrated in the annexed drawing, in which.

Figure 8:
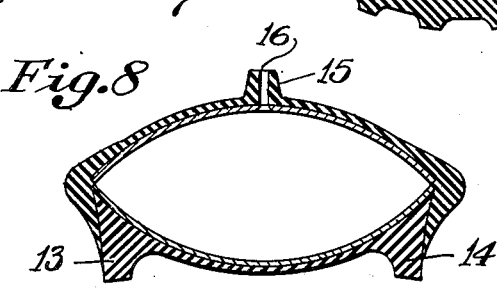

Fig. 8 illustrates two projections of resilient material at the level of the lateral borders of the tube-track in the portion in contact with the ground, which allow the tube-track to preserve its shape increasing thereby its bending-resistance even when undergoing bending-momenta by far superior to the momentum-limit; there being illustrated one or more projections on the opposite portion of the tube-track, devised for the purpose of preserving for the tube-track its correct transverse position in respect to the terminal guiding wheels.

According to the present invention the track-system comprises a tubular element, closed in itself, following a mixtilinear development I embodied in a flexible material of small thickness, but practically inextensible (e. g. steel, light alloys, bronze, synthetic-resins etc.) with its transverse section opportunely profiled in the shape of an arc, either curve or polygonal, for the purpose of obtaining a high resistance to the transverse bending (that is to say a high momentum of inertia) in the rectilinear extensions comprised between the terminal wheels, and an elevated flexibility in the portions, in which the tube-track, rendered flat, is being wound around the arcs of circle 2 as represented by the wheels 3. To the end of rendering possible the easy flattening of the track, within the zones in which it is bending over along an arc, the cross-section of the continuous tube, should be appropriately chosen. A shape of section which, by way of example, is quoted here as being opportune, is the lenticular one with a biconvex profile.

Figure 2:
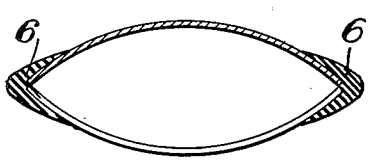
Fig. 2 shows the section of the tube-track in the biconvex lenticular shape obtained through the union of two half-tubes with curved profile, jointed on the joint-cover receiving lips of an unyieldable elastic material.

In order to ensure a higher flexibility and slidability, the tube, along the two generatrices corresponding to the zone of joint, between the two convex surfaces, might be previously cut in such a way as to separate the two convex surfaces (4 and 5 in Fig. 2). The wall is thereafter returned to its original continuity, by means of elastic joint-covers, made of some flexible but not extensible material.

Figure 1:
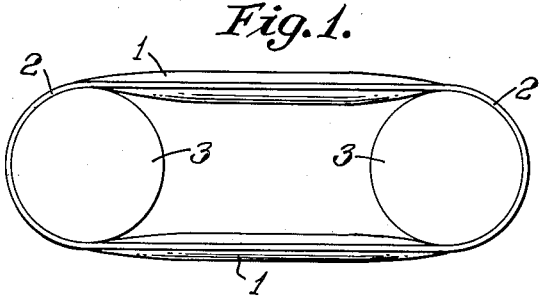
Fig. 1 shows the shape assumed by the annularly closed tube-track when it is mounted on the two or more supporting wheels.
Figure 3:
Fig. 3 illustrates the section of the tube-track with flattened section.
Figure 4:
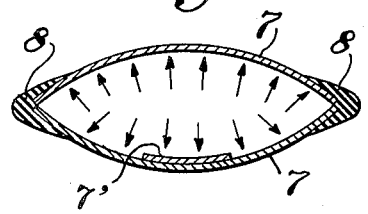
Fig. 4 shows the shape assumed by the tube-track with plane section, when it is inflated by means of air or gas compressed in the interior.

Another embodiment of the tubular-track, object of the present invention, is obtained by adopting a tube previously flattened in the shape of plane and tallying faces 7 (Fig. 3) connected along the borders as provided for the connection-covers 8. The flat tube-track, according to this form of embodiment, by virtue of its flat walls, possesses complete flexibility within the zones 2 (Fig. 1) bent according to an arc of a circle. The bending resistance within the zones 1, comprised between the end wheels, is ensured by overincreasing the air-pressure which exists in the interior of the tube, through inflating (Fig. 4). The increase of the pressure in the interior of the tube-track, enhances the convexity of the profile, and hence increases the resistance to the bending, within the rectilinear zones. In the zones, in which the track is being wound on the wheels, the deformation of the walls in a cylindrical form, compels the said walls to flatten and to return tallying so as to take again the biconvex shape, where the tube-track leaves the wheel. In order to keep the walls 7 in a slightly spaced position, an inside band 7' is employed, when they are passing together over the terminal wheels, so as to secure a pneumatic communication between all the elements of the tube-track.

Figure 5:
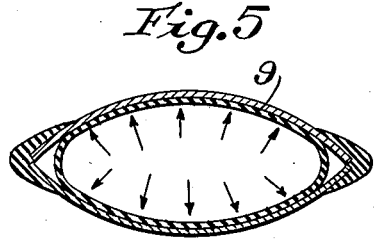
Fig. 5 shows the section of the tube-track under pressure, when the air is introduced in an air-chamber arranged in the interior of the walls of the tube itself.
Figure 6:
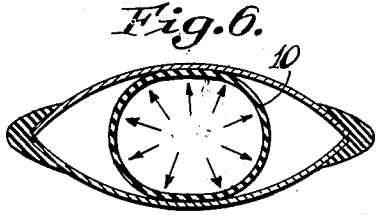
Fig. 6 illustrates the section of the tube-track under pressure, when there is adopted an air-chamber of a size inferior to the development of the walls, in such a way that the action due to the pressure should be exerted only on the central zone of the walls themselves.

According to another embodiment of the present invention, in the interior of the flattened tube-track an air chamber is inserted which occupies entirely (Fig. 5) or partially (Fig. 6) the space 10 existing between the walls. In similar cases the pressure, which deforms the walls, according to a biconvex shape, is established in the interior of the said air-chamber. In the case of a central and cylindrical air-chamber (Fig. 6) the concentration of the internal reaction on the central zone of the lenticular section will remarkably increase the rigidity of the tube, diminishing thus the possibility of its becoming scalloped.

Figure 7:
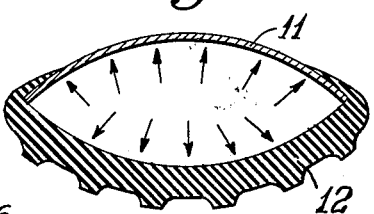
Fig. 7 illustrates the section of the tube-track set under pressure, when one of two walls is constituted by some rigid material (for example: steel, light alloys, synthetic resins, etc.), the other being made of resilient matter (e. g. rubber).

According to another embodiment of the invention, the tube-track may be constructed of two half-walls 11 and 12 (Fig. 7) jointed by the lips, as previously stated, yet with the difference, that one of them (e. g. the inside one) which comes into contact with the wheels, can be made of steel whereas the other one of some reinforced resilient material (e. g. reinforced or cloth inserted rubber).

The internal pressure, applied either directly or within an air-chamber ensures the maintenance of the lenticular cross-section, be it with flat or with curvilinear profiled walls. In the case in which it is the exterior wall, which is made of some resilient material (e. g. rubber), the track will have a more pronounced attitude to damp the small roughnesses of the ground.

In another form of embodiment, the structure of the tube-track is completed by three ribs of some elastic material e. g. rubber, appropriately shaped (Fig. 8), which in the drawing are marked with the reference characters 13, 14 and 15. Of the said ribs, the 13 and the 14 are applied along the marginal zones of the tube-track with a lenticular cross-section, at the level of the external face, which operates as a tread-band, on the other hand the rib 15 is applied along the midline of the opposite face. The said ribs, in their longitudinal development, are interrupted, respectively, by a plurality of deep slots so as to maintain for the whole assembly the relative transversal flexibility, during its flattening. The purpose of the said three ribs is as follows: the ribs 13 and 14 are applied in order to protect the wall of the tube-track which operates as a tread-band; moreover, they have the task of condensing the reaction of the ground toward the marginal zones of the lenticular tube, diminishing or annulling it completely, the pressure being equal, within the central zone of the tread-band. This is of primary importance in order to avoid scalloping.

The central rib 15, applied on the face of the tube-track, which contacts the wheels, serves, on the other hand, to create a guide fit to prevent the transverse heeling of the track with respect to the wheels, which are provided, in the central portion thereof, with a groove the profile of which corresponds to that of the rib. Moreover, in the thickness of the rib 15 the valve 16 is located, which is necessary for the inflation and the preservation of the pressure in the interior of the tube-track, be it with or without air chamber. Instead of only one guiding rib in central position, it might be desirable to use two or more guiding ribs, within the concept of my invention.

The tube-track, as described in the present application according to its various forms of practical embodiment, be it with or without the use of internal pressures, possesses a remarkable glidingness, without engendering any of the inadmissible stresses within the walls of the tube-track and in the border-joints, still possessing, at the same time, a very high resistance to both bending and scalloping, due to the transverse and perpendicular stresses because of the elevated inertia momentum of its form as well as of the complete stability ensured by such form.

I claim:

1. A track for track laying vehicles comprising a tube having thin walls formed with two transversely curved bands made of flexible but substantially inextensible material and having the concavities of said bands facing each other, and two strips of resilient material connecting the bands together at their opposite longitudinal side edges so as to render the tube airtight.

2. A track for track laying vehicles comprising a tube having thin walls of lenticular cross-section formed with two transversely curved bands made of flexible but substantially inextensible material disposed with the concavities of said bands facing each other and resilient material connecting the bands together at their opposite longitudinal side edges so as to render the tube airtight, said curved bands being adapted to be flattened into proximity with each other when the track is bent longitudinally.

3. A track for track laying vehicles, comprising an outer tube having thin walls of lenticular cross-section, formed with two transversely curved bands of flexible but substantially inextensible material, disposed with the concavities of the bands facing each other, and resilient material joining the bands together along their opposite longitudinal side edges, and an inflatable inner tube which is confined in said outer tube and assumes a lenticular section when inflated, whereby the outer surface of the inner tube substantially coincides with the inner surface of the outer tube.

4. A track for track laying vehicles, comprising an outer tube having a lenticular cross-section with the smaller axis lying in a vertical plane, formed with two transversely curved bands substantially inextensible but flexible material disposed with the concavities of the bands facing each other and joined along the edges by means of resilient material, and an inflatable inner tube which is confined in said outer tube and assumes a substantially circular cross-section when inflated, whereby the outer surface of the inner tube becomes tangent to the inner surface of the outer tube only along a zone adjacent to the middle lower and upper generatrices of the outer tube.

5. A track for track laying vehicles comprising an endless tube of lenticular cross-section having transversely curved upper and lower walls disposed with their concavities facing one another and meeting at their opposite longitudinal side edges in acute angles, said walls being joined along their opposite longitudinal side edges by resilient material permitting flattening of said walls in a transverse direction and bending of the tube in a longitudinal direction.

6. A track for track laying vehicles, comprising an endless inflatable tube of lenticular cross-section having transversely curved upper and lower walls disposed with their concave sides facing one another, said walls meeting in acute angles at their opposite longitudinal side edges and being joined together along said edges by resilient material permitting flattening of said walls in a transverse direction and bending the tube in a longitudinal direction.

7. A track for track laying vehicles, comprising two transversely curved endless bands of flexible resilient material disposed with their concave sides facing one another, said bands meeting in acute angles at their opposite longitudinal side edges and being joined together along said edges to form an endless tubular track of lenticular cross-section.

8. A track for track laying vehicles, comprising two transversely curved flexible bands, disposed with their concave sides facing one another, at least one of said bands being formed of flexible metal, said bands meeting in an angle at their opposite longitudinal side edges and being flexibly joined together along said edges to form an endless tubular track of lenticular cross-section.

GIOVANNI BONMARTINI.

REFERENCES CITED

The following references are of record in the file of this patent:

UNITED STATES PATENTS

| Number | Name | Date |
|---|---|---|
| 1,986,865 | Tschappat | Jan. 8, 1935 |
| 2,169,443 | Burke | Aug. 15, 1939 |
| 2,337,074 | Walker | Dec. 21, 1943 |

FOREIGN PATENTS

| Number | Country | Date |
|---|---|---|
| 622,337 | France | of 1927 |